United States Patent
Walline et al.

(10) Patent No.: US 8,463,709 B2
(45) Date of Patent: Jun. 11, 2013

(54) IDENTIFYING AND LABELING LICENSED CONTENT IN AN EMBEDDED PARTITION

(75) Inventors: Erin Kurusz Walline, Pflugerville, TX (US); Steve Bracamontez, Austin, TX (US); David Zavelson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1972 days.

(21) Appl. No.: 11/401,980

(22) Filed: Apr. 11, 2006

(65) Prior Publication Data
US 2007/0239616 A1 Oct. 11, 2007

(51) Int. Cl.
*G06F 21/00* (2006.01)

(52) U.S. Cl.
USPC .............................. 705/59; 705/51; 705/57

(58) Field of Classification Search
USPC ............................................. 705/51, 57, 59
See application file for complete search history.

(56) References Cited

U.S. PATENT DOCUMENTS

| | | | | |
|---|---|---|---|---|
| 4,355,225 A * | 10/1982 | Marsh | ............................ | 219/216 |
| 5,659,756 A * | 8/1997 | Hefferon et al. | ............... | 710/200 |
| 5,710,930 A * | 1/1998 | Laney et al. | ................... | 713/300 |
| 6,065,123 A * | 5/2000 | Chou et al. | ..................... | 713/322 |
| 6,144,401 A * | 11/2000 | Casement et al. | ............... | 725/30 |
| 6,236,983 B1 * | 5/2001 | Hofmann et al. | ............... | 706/47 |
| 6,564,286 B2 * | 5/2003 | DaCosta | ....................... | 711/103 |
| 6,763,458 B1 * | 7/2004 | Watanabe et al. | ............. | 713/100 |
| 6,765,788 B2 * | 7/2004 | Wu | ........................... | 361/679.08 |
| 6,807,558 B1 * | 10/2004 | Hassett et al. | ................. | 709/203 |
| 6,931,474 B1 * | 8/2005 | Ginosar | .......................... | 710/316 |
| 6,978,291 B2 * | 12/2005 | Vardi et al. | ..................... | 709/202 |
| 7,062,468 B2 * | 6/2006 | Hillegass et al. | ................ | 705/59 |
| 7,383,061 B1 * | 6/2008 | Hawkins | ..................... | 455/556.2 |
| 7,607,003 B2 * | 10/2009 | Tseng | .................. | 713/2 |
| 7,634,734 B2 * | 12/2009 | Fuller et al. | .................... | 715/741 |
| 7,679,397 B1 * | 3/2010 | Kok et al. | ......................... | 326/30 |
| 7,925,973 B2 * | 4/2011 | Allaire et al. | .................. | 715/248 |
| 2002/0049679 A1 | 4/2002 | Russell et al. | ................... | 705/52 |
| 2002/0188704 A1 * | 12/2002 | Gold et al. | ...................... | 709/221 |
| 2003/0115147 A1 * | 6/2003 | Feldman et al. | ................ | 705/64 |
| 2005/0018873 A1 | 1/2005 | Rhoads | .......................... | 382/100 |
| 2005/0060549 A1 * | 3/2005 | England et al. | ............... | 713/175 |
| 2005/0071280 A1 * | 3/2005 | Irwin et al. | ....................... | 705/59 |
| 2005/0114265 A1 | 5/2005 | Satkunanathan et al. | ........ | 705/59 |
| 2005/0114266 A1 | 5/2005 | Satkunanathan et al. | ........ | 705/59 |
| 2005/0114527 A1 * | 5/2005 | Hankey et al. | ................. | 709/228 |
| 2005/0273663 A1 * | 12/2005 | Yoon | ................................ | 714/36 |

(Continued)

OTHER PUBLICATIONS

"InterVideo InstantOn dual-boot delivers CE-like PC experience." May 5, 2004. All pages. Retrived via Wayback Machine on Jan. 13, 2010. http://afterdawn.com/news/archive/5208.cfm.*

(Continued)

*Primary Examiner* — Tuan C. To
*Assistant Examiner* — Calvin Cheung
(74) *Attorney, Agent, or Firm* — Terrile, Cannatti, Chambers & Holland, LLP; Stephen A. Terrile

(57) ABSTRACT

A system for providing users with an indication of files that are protected or licensed while a user is executing within the embedded partition set forth. The system enables users to quickly boot into an embedded environment and have an indication of all of their media files, whether the content is accessible via the embedded environment or the content is protected or licensed content stored within another partition. Thus, the user receives an indication that the protected or licensed content is still on their computer and that the user cannot access the protected or licensed content via the embedded environment.

2 Claims, 5 Drawing Sheets

U.S. PATENT DOCUMENTS

| | | | |
|---|---|---|---|
| 2006/0106729 A1* | 5/2006 | Roberts, Jr. | 705/59 |
| 2006/0149956 A1* | 7/2006 | Chang | 713/1 |
| 2007/0220246 A1* | 9/2007 | Powell et al. | 713/2 |
| 2009/0037722 A1* | 2/2009 | Chong et al. | 713/2 |

OTHER PUBLICATIONS

Drucker, D. "Instant-On: Four quick-start laptops are ready to entertain whenever you are." Mar. 2005. All pages. Retrived Jan. 13, 2010. http://archive.laptopmag.com/Features/Instant-On-Notebooks.htm.*

Norton PartitionMagic 8.0 User Guide. 2004. All pages.*

"InterVideo InstantON Technology in New Sony." May 9, 2005. All Pages. Retrieved Jan. 13, 2010. http://www.beststuff.com/computers/intervideo-instanton-technology-in-new-sony-vaio-notebooks.html.*

* cited by examiner

IDENTIFYING AND LABELING LICENSED CONTENT IN AN EMBEDDED PARTITION

BACKGROUND OF THE INVENTION

1. Field of the Invention

The present invention relates to information handling systems and more particularly to identifying content accessed via an embedded partition.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with a MediaDirect application. MediaDirect is an example of an instant on media application which provides an instant on function to enable fast access to files such as media files. Known MediaDirect enabled systems can include the MediaDirect solution via a separate (possibly hidden) partition. In some MediaDirect enabled systems, the separate partition image includes an XP embedded (XPe) operating system (OS), platform drivers and the MediaDirect application.

Known MediaDirect enabled systems present challenges. For example, a MediaDirect partition can be directly accessed by the customer when the customer actuates a MediaDirect button. However, no network connection is available when the customer uses MediaDirect in this way. Additionally, no digital rights management content can be played when the customer is operating in the MediaDirect hidden partition.

Accordingly, when executing an information handling system via the—embedded partition solution, users may not have access to protected/licensed content that is stored within another (e.g, an operating system) partition. The protected or licensed content can include media content such as music or videos purchased online, as well as other types of content such as games.

Accordingly, it is desirable to provide users with an indication of files that are protected or licensed while a user is executing within the embedded partition.

SUMMARY OF THE INVENTION

In accordance with the present invention, a system for providing users with an indication of files that are protected or licensed while a user is executing within the embedded partition is set forth. The system thus enables users to quickly boot into an embedded environment and have an indication of all of their media files, whether the content is accessible via the embedded environment or the content is protected or licensed content stored within another partition. Thus, the user receives an indication that the protected or licensed content is still on their computer and that the user cannot access the protected or licensed content via the embedded environment.

For content that is protected or licensed, but not accessible via the embedded partition, the system presents a graphical indication (e.g., a lock graphic) located next to the filename in the embedded environment. Additionally, the filename is indicated as not accessible (by for example presenting the filename is a different color than accessible files (e.g., graying out)).

More specifically, in one embodiment, the invention relates to a method for accessing digital content on an information handling system. The method includes providing the information handling system with a first operating system partition and a second operating system partition, storing an instant on application within the second operating system partition, storing a license module within the first operating system partition, determining via the license management module stored on the first operating system partition whether certain content is licensed; presenting a list of content stored on the information handling system via the instant on application, the presenting differentiating between content that is accessible by the instant on application and content that is inaccessible by the instant on application.

In another embodiment, the invention relates to an apparatus for accessing digital content on an information handling system. The apparatus includes means for providing the information handling system with a first operating system partition and a second operating system partition, means for storing an instant on application within the second operating system partition, means for storing a license module within the first operating system partition, means for determining via the license management module stored on the first operating system partition whether certain content is licensed; and, means for presenting a list of content stored on the information handling system via the instant on application, the presenting differentiating between content that is accessible by the instant on application and content that is inaccessible by the instant on application.

In another embodiment, the invention relates to an information handling system apparatus for accessing digital content. The information handling system includes a processor; a memory coupled to the processor; a first operating system partition stored on the memory; a second operating system partition stored on the memory; and, an instant on application stored within the second operating system partition. The instant on application includes a presenting module which presents a list of content stored on the first operating system partition and the second operating system partition of the information handling system. The presenting differentiates between content that is accessible by the instant on application and content that is inaccessible by the instant on application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
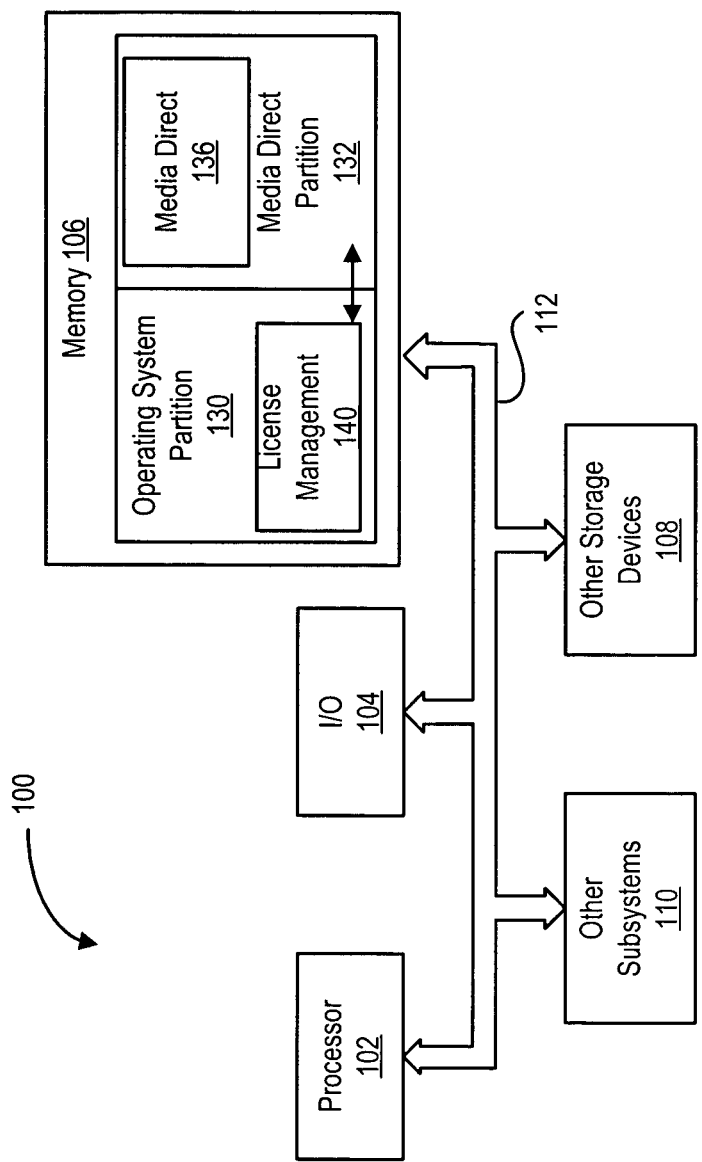
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers, memory 106 including non-volatile memory such as a hard disk drive and volatile memory such as random access memory, and other storage devices 108, such as a CD ROM or DVD disc and drive, and various other subsystems 110, all interconnected via one or more buses 112. The hard disk drive of the memory 106 includes a main operating system partition 130 and an instant on (e.g., MediaDirect) partition 132. The instant on partition 132 includes an instant on media (e.g., MediaDirect) application 136. The main operating system partition 130 includes a license management module 140 which communicates with the instant on media application 136 stored on the instant on partition 132.

The instant on media application 136 provides users with an indication of files that are protected or licensed while a user is executing within the embedded partition 132. The instant on media application 136 thus enables users to quickly boot into an embedded environment and have an indication of all of their media files, whether the content is accessible via the embedded environment of the content is protected or licensed content stored within another partition. Thus, the user receives an indication that the protected or licensed content is still on their computer and that the user cannot access the protected or licensed content via the embedded environment.

For content that is protected or licensed, but not accessible via the embedded partition 132, the instant on media application 136 presents a graphical indication (e.g., a lock graphic) located next to the filename of the content that is not executable via the embedded partition 132. Additionally, the filename is indicated as not accessible (by for example presenting the filename is a different color than accessible files (e.g., graying out)).

A user can access content on instant on (such as MediaDirect) enabled information handling system 100. When a user attempts to access licensed digital content via an instant on partition 132, the instant on media application 136 accesses the license management module 140 that resides within the main operating system partition 130 present a list of all of the content that is present on the information handling system 100 whether or not the content is executable while the user is operating within the instant on environment.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
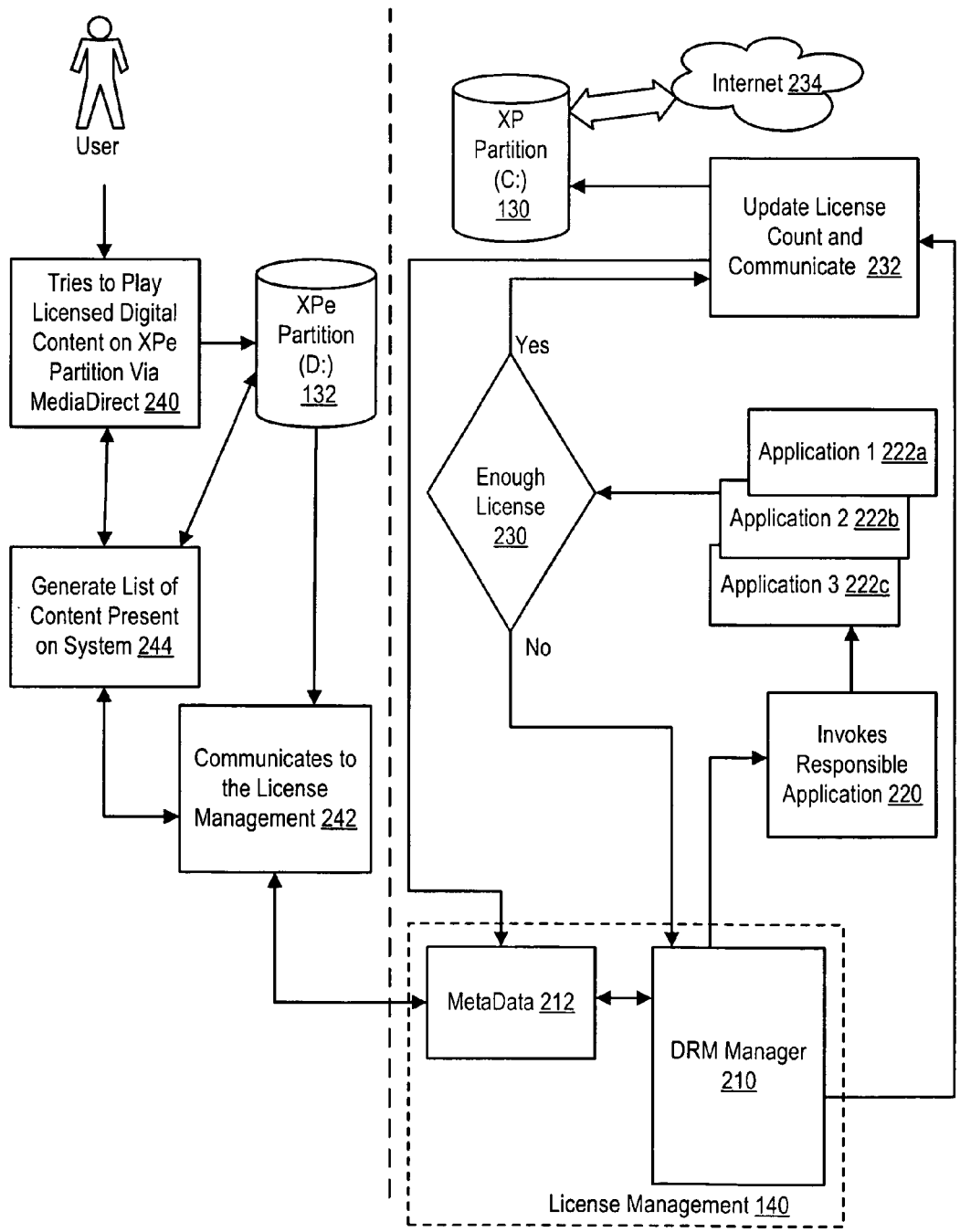
FIG. 2 shows a flow chart of the operation of the process for identifying and labeling licensed content when accessed via a distinct partition.

FIG. 2 shows a flow chart of the operation of the process for identifying and labeling licensed content when accessed via a distinct partition is shown. More specifically, the license management module 140 includes a digital rights manager 210 as well as license meta data 212. The license meta data 212 is updated by the digital rights manager 210 whenever the user is logged into the main operating system partition 130.

The digital rights manager 210 invokes (at step 220) a responsible application 222a, 222b, 222c for license access. The application 222 determines whether there are enough licensed accesses available at step 230 and updates the license count at step 232. This updated license count is communicated to the meta data 212 as well as the appropriate license provider (e.g., via the Internet 234). For example, if a game has 20 licensed accesses and a customer has already played the game on the main operating system partition 10 times, then the meta data 212 on the operating system partition 130 is updated so that access is granted for playing the game for up to the remaining ten authorized accesses.

When a user attempts to access license content on the extended instant on partition 132 via the instant on application 136 at step 240, the instant on application 136 communicates with the license management module 140 (and more specifically, the license meta data 212 of the license management module 140) at step 242. The license meta data 212 indicates whether there are enough license access available to permit accessing the digital content. The instant on application 136 then generates a list of content that is present on the system based upon the meta data at step 244.

The operation of the process is seamless and happens substantially instantaneously from the perspective of the user. If the license on the content has expired as indicated by the meta data, then the instant on partition 132 can also provide a message the user that the content cannot play due to the expired license.

Figure 3:
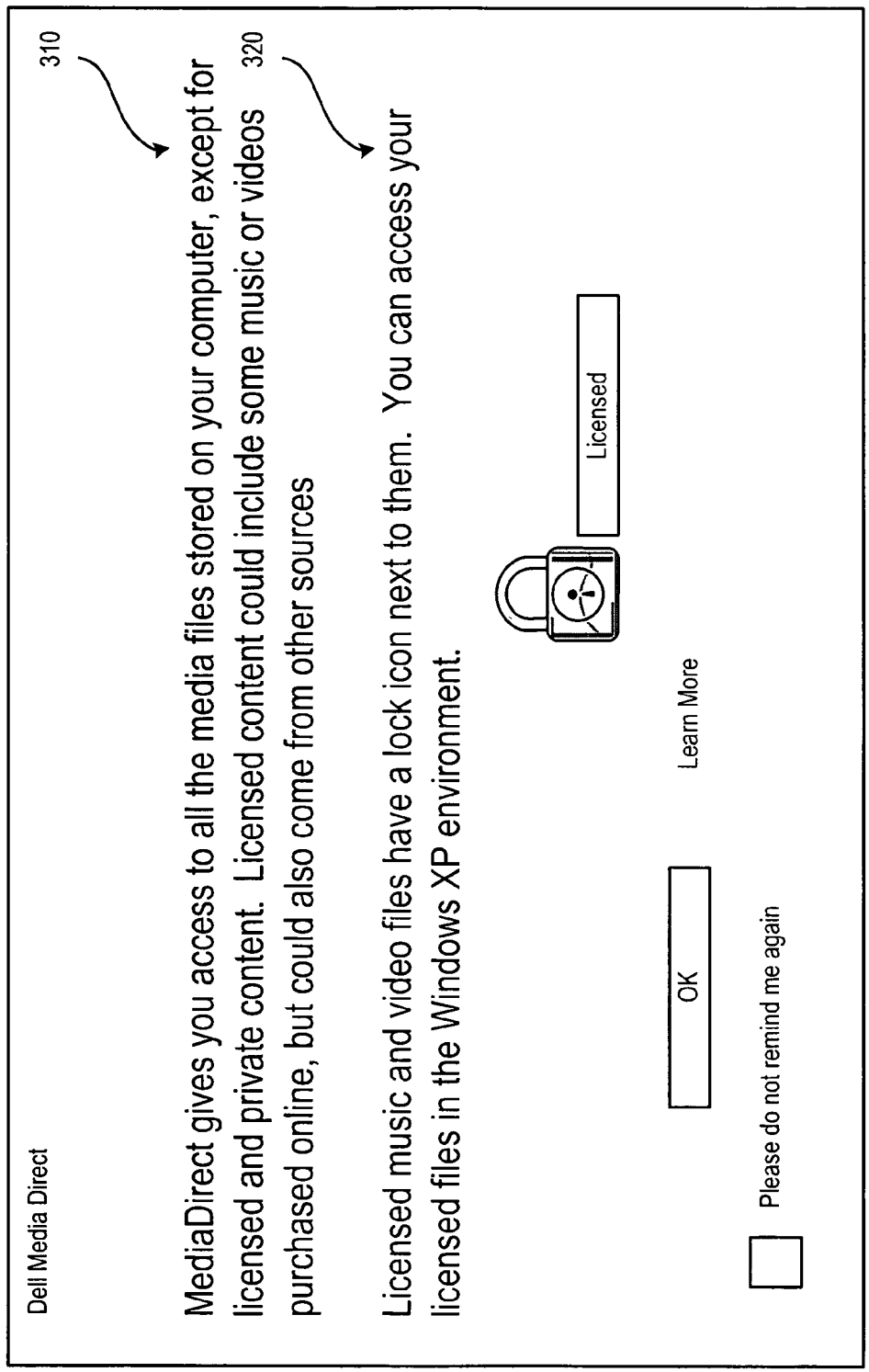
FIG. 3 shows an example screen presentation of information regarding licensed content.

Referring to FIG. 3, an example screen presentation of information regarding licensed content is shown. More specifically, when a user first executes the instant on application 136, the instant on application 136 presents the user with information 310 regarding which files the user may access via the instant on partition. The instant on application 136 also presents the user with information 320 regarding how files that are not accessible via the instant on partition are represented by the instant on application. Unless the user otherwise indicates, this information is presented each time the user executes the instant on application 136.

Figure 4:
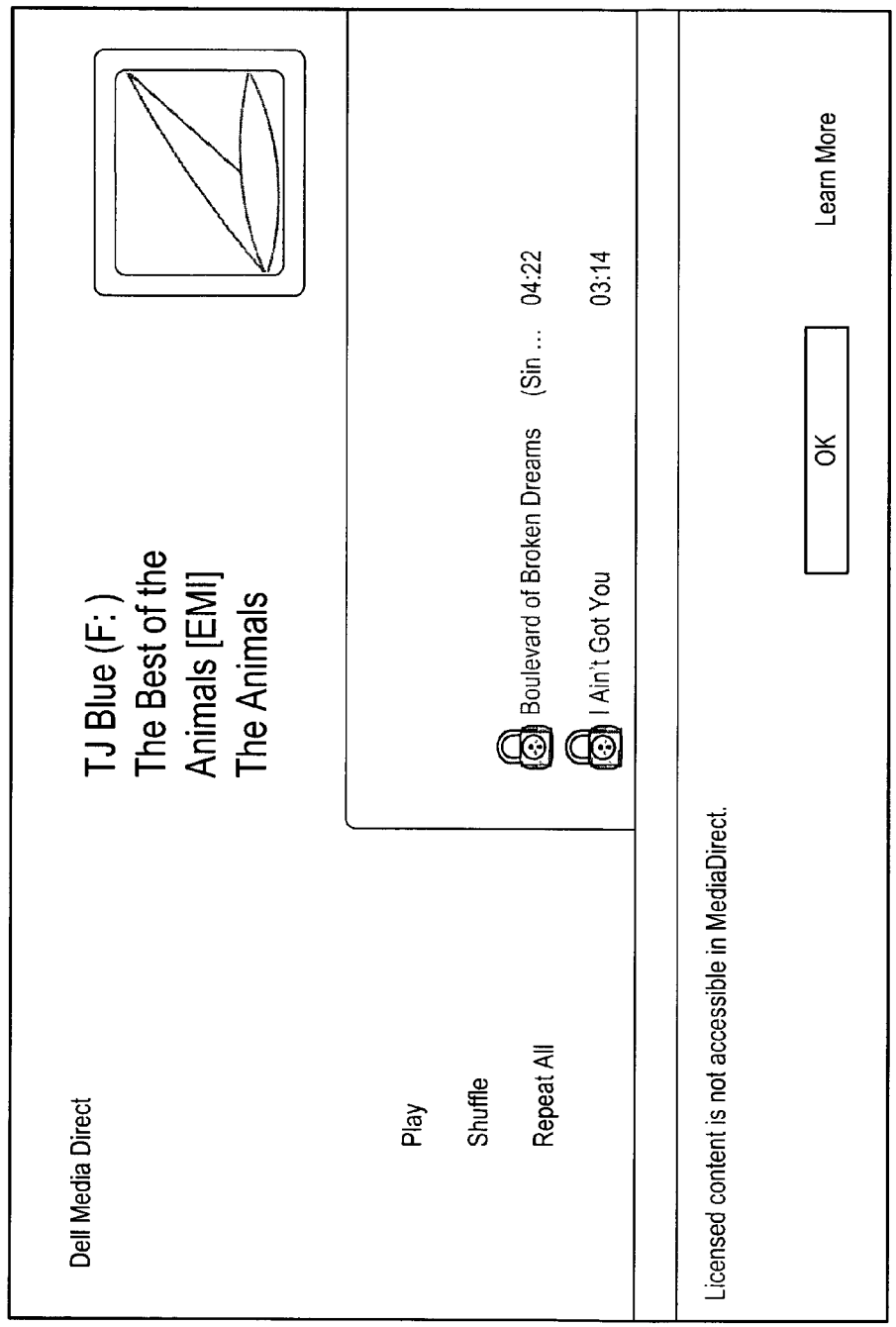
FIG. 4 shows an example screen presentation of how licensed and locked content are indicated for music content.

Referring to FIG. 4, an example screen presentation of how licensed and locked content are indicated for music content is shown. More specifically, when a user elects to view a list of music content via the instant on application 136, a list 410 (via, e.g., a file list) is presented. The list 410 can include accessible content 420 and inaccessible content 430. The accessible content 420 is actuatable to allow presentation via the instant on application 136. The inaccessible content 430 is indicated as locked and is differentiated by color to provide the user with an indication that this content is not presentable via the instant on application 136.

Figure 5:
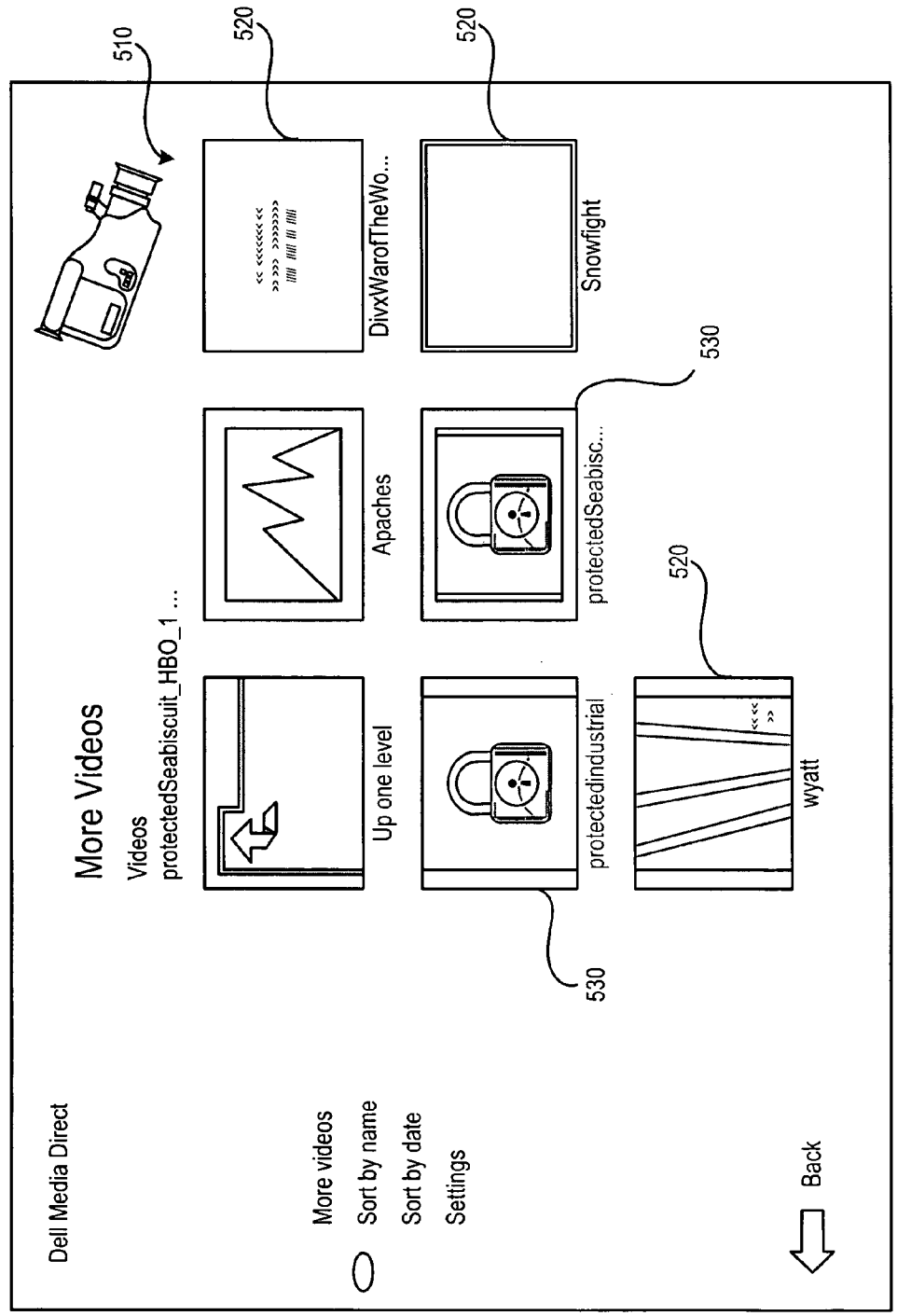
FIG. 5 shows an example screen presentation of how licensed and locked content are indicated for video content.

FIG. 5 shows an example screen presentation of how licensed and locked content are indicated for video content. More specifically, when a user elects to view a list of video content via the instant on application 136, a list 510 (via, e.g., icons) is presented. The list 510 can include accessible content 520 and inaccessible content 530. The accessible content 520 is actuatable to allow presentation via the instant on application 136. The inaccessible content 530 is indicated as locked and is differentiated by color to provide the user with an indication that this content is not presentable via the instant on application 136.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

For example, it will be appreciated that the concept of differentiating the presentation of protected/licensed files may include other types of files in addition to media files.

Also for example, it will be appreciated that any known method of presenting a list of files (e.g., a file list, a set of icons, a detailed list) are within the scope of the present invention.

Also for example, other types of instant on media applications in addition to the MediaDirect application are within the scope of the invention.

Consequently, the invention is intended to be limited only by the spirit and scope of the appended claims, giving full cognizance to equivalents in all respects.

What is claimed is:

1. A method for accessing digital content on an information handling system comprising:
    providing the information handling system with a first operating system partition and a second operating system partition;
    storing an operating system within the first operating system partition;
    storing an instant on application within the second operating system partition, the instant on application providing the information handling system with an instant on function to enable access to files without having to boot an operating system;
    storing a license management module within the first operating system partition;
    determining via the license management module stored on the first operating system partition whether certain content is licensed, the license management module executing on the information handling system; and
    presenting a list of content stored on the information handling system via the instant on application, the presenting differentiating providing an indication of a difference between content that is accessible by the instant on application and content that is inaccessible by the instant on application, the instant on application executing on the information handling system; and wherein
    the presenting includes presenting a graphical representation corresponding to each piece of content that is inaccessible by the instant on application.

2. The method of claim 1 wherein
    the graphical representation includes a representation that the content that is inaccessible is locked.

* * * * *